(12) United States Patent
Korotkov et al.

(10) Patent No.: US 12,008,435 B2
(45) Date of Patent: Jun. 11, 2024

(54) FREQUENCY CONFIGURATION IN QUANTUM GATES FOR LEAKAGE REMOVAL

(71) Applicant: Google LLC, Mountain View, CA (US)

(72) Inventors: Alexander Nikolaevich Korotkov, Riverside, CA (US); Kevin Joseph Satzinger, Goleta, CA (US); Matthew James McEwen, Santa Barbara, CA (US); Vadim Smelyanskiy, Mountain View, CA (US); Paul Victor Klimov, Santa Barbara, CA (US); Rami Barends, San Diego, CA (US); Julian Shaw Kelly, Santa Barbara, CA (US); Juan Carlos Atalaya-Chavez, Berkeley, CA (US); Zijun Chen, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 157 days.

(21) Appl. No.: 17/694,820

(22) Filed: Mar. 15, 2022

(65) Prior Publication Data

US 2022/0414514 A1 Dec. 29, 2022

Related U.S. Application Data

(60) Provisional application No. 63/161,180, filed on Mar. 15, 2021.

(51) Int. Cl.
*G06N 10/70* (2022.01)
*G06N 10/40* (2022.01)

(52) U.S. Cl.
CPC .................................. *G06N 10/40* (2022.01)

(58) Field of Classification Search
CPC .............................. G06N 10/00; G06N 10/70
See application file for complete search history.

(56) References Cited

U.S. PATENT DOCUMENTS

2020/0258000 A1\* 8/2020 Martinis ................ G06N 10/00
2021/0035007 A1 2/2021 Martinis et al.

FOREIGN PATENT DOCUMENTS

WO WO-2019032106 A1 \* 2/2019 ............. G06F 15/80

OTHER PUBLICATIONS

International Search Report and Written Opinion for Application No. PCT/US2022/020359, dated Jun. 24, 2022, 11 pages.

(Continued)

*Primary Examiner* — Patrick O Neill
(74) *Attorney, Agent, or Firm* — DORITY & MANNING P.A.

(57) ABSTRACT

A quantum computing system configured for removal of leakage states can include quantum hardware including a first qubit and a second qubit, wherein the first qubit is configured to have a first transition frequency and wherein the second qubit is configured to have a second transition frequency, the first transition frequency being greater than the second transition frequency. The quantum computing system can include one or more quantum control devices configured to control operation of at least the first qubit and the second qubit, wherein the one or more quantum control devices are configured to implement a quantum gate operation on the first qubit and the second qubit based at least in part on the first transition frequency and the second transition frequency, and wherein the one or more quantum control devices are configured to periodically reset a quantum state of the first qubit.

20 Claims, 8 Drawing Sheets

(56) References Cited

OTHER PUBLICATIONS

International Preliminary Report on Patentability for PCT/US2022/020359, dated Sep. 28, 2023, 7 pages.

* cited by examiner

FREQUENCY CONFIGURATION IN QUANTUM GATES FOR LEAKAGE REMOVAL

FIELD

The present disclosure relates generally to frequency configuration in quantum gates for leakage removal.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$. The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a quantum computing system configured for removal of leakage states. The quantum computing system can include quantum hardware including a first qubit and a second qubit, wherein the first qubit is configured to have a first transition frequency and wherein the second qubit is configured to have a second transition frequency, the first transition frequency being greater than the second transition frequency. The quantum computing system can include one or more quantum control devices configured to control operation of at least the first qubit and the second qubit, wherein the one or more quantum control devices are configured to implement a quantum gate operation on the first qubit and the second qubit based at least in part on the first transition frequency and the second transition frequency, and wherein the one or more quantum control devices are configured to periodically reset a quantum state of the first qubit.

Another example aspect of the present disclosure is directed to a quantum computing system configured for removal of leakage states. The quantum computing system can include quantum hardware including a plurality of qubits arranged in a qubit grid, the plurality of qubits comprising one or more data qubits configured to implement quantum gate operations with a plurality of measurement qubits, wherein the quantum gate operations each include a higher-frequency side and a lower-frequency side, wherein the lower-frequency side is configured to be implemented at the one or more data qubits.

Another example aspect of the present disclosure is directed to a computer-implemented method for implementing quantum gate operations. The computer-implemented method can include configuring, by one or more quantum control devices, a first qubit of quantum hardware at a first transition frequency. The computer-implemented method can include configuring, by the one or more quantum control devices, a second qubit of the quantum hardware at a second transition frequency, the first transition frequency being greater than the second transition frequency. The computer-implemented method can include implementing, by the one or more quantum control devices, a quantum gate operation at the first qubit and the second qubit based at least in part on the first transition frequency and the second transition frequency, wherein the one or more quantum control devices are configured to periodically reset a quantum state of the first qubit.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
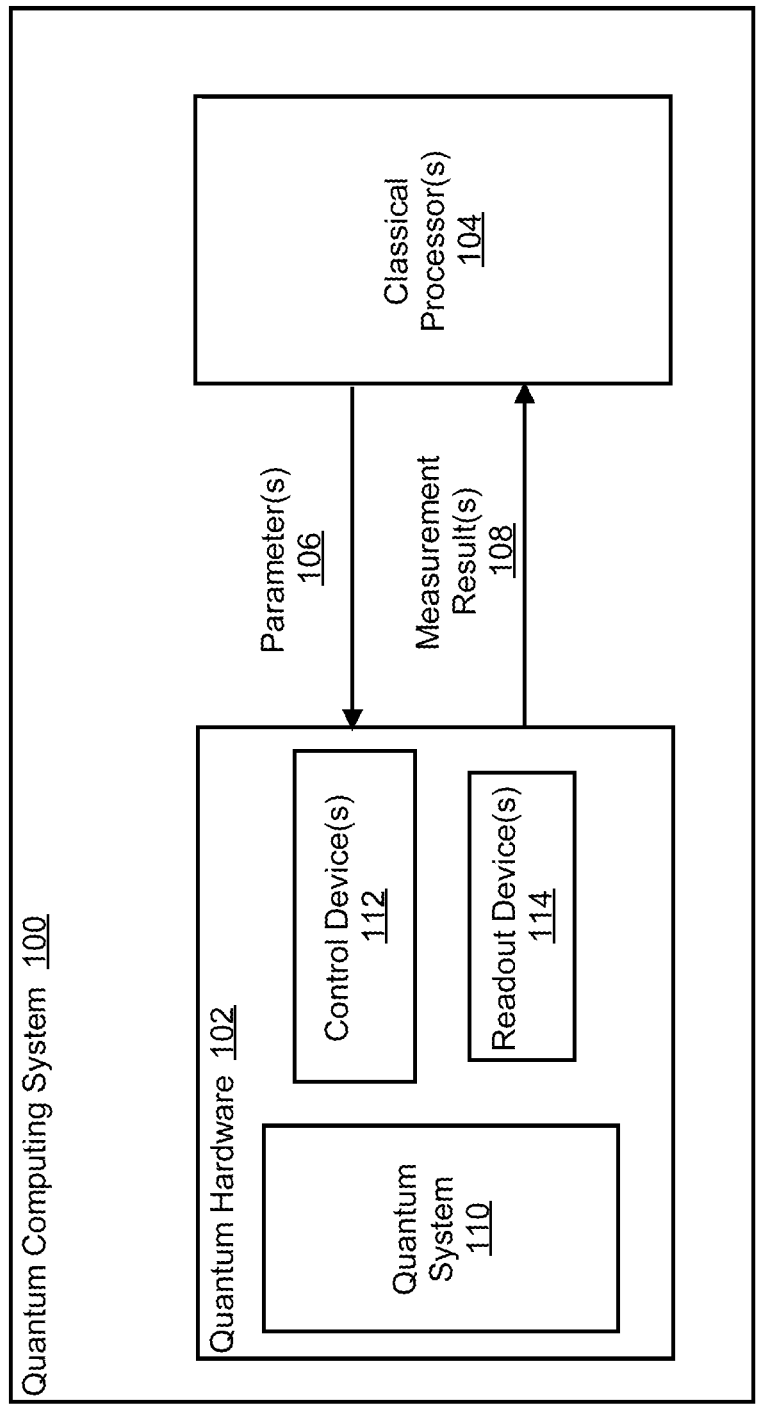
FIG. 1 depicts an example quantum computing system according to example embodiments of the present disclosure.

Example aspects of the present disclosure are directed to frequency configuration in quantum gates for leakage removal and, more particularly, to configuration of frequencies in a quantum grid (e.g., including measurement qubits and data qubits) to isolate potential leakage points for removal from a quantum computing system. Some quantum gates (e.g., controlled-Z diabatic quantum gates) can be implemented based at least in part on a frequency difference between operating frequencies (e.g., transition frequencies) of a first qubit and a second qubit. The quantum gates can be implemented in one of two configurations, including a configuration in which the operating frequency of the first qubit is greater than that of the second qubit or the configuration in which the operating frequency of the second qubit is greater than that of the first qubit. According to example aspects of the present disclosure, a quantum gate operation can be configured wherein a higher frequency side of the quantum gate operation is provided at a measurement qubit and a lower frequency side of the quantum gate operation is provided at a data qubit. The measurement qubit can be periodically refreshed to remove leakage conditions. This configuration can reduce the impact of leakage conditions on operation of a quantum computing system.

A quantum computing system can include a qubit grid including a plurality of qubits arranged in a grid configuration. The qubit grid can include one or more data qubits and one or more measurement qubits. For instance, in some implementations, the qubit grid can be an interlaced grid of data qubits and measurement qubits such that each data qubit is surrounded in the grid by measurement qubits and/or each measurement qubit is surrounded in the grid by data qubits (e.g., other than at edges of the qubit grid). The data qubits can perform computations for evaluation of one or more quantum algorithms. Additionally and/or alternatively, the measurement qubits can be configured to read out and/or monitor parity of the quantum computing system (e.g., the data qubits). For instance, quantum read-outs can be read out of the measurement qubits periodically, such as at on the order of microsecond intervals.

This qubit grid can be implemented according to various quantum error correction codes such as, for example, the quantum surface code or its simplified version, the repetition code. For instance, the repetition code can be a simplified version of the quantum surface code that is useful for certain tasks, such as testing. Example aspects of the present disclosure can be useful in quantum computing systems according to quantum error correction codes having alternating grids of qubits.

The qubits can be frequency-variable qubits such that an operating frequency (e.g., transition frequency) of the qubits can be varied. For instance, in some implementations, a transition frequency of a qubit can be varied, such as within a range of candidate transition frequencies. In some implementations, the operating frequency (e.g., transition frequency) can be varied by one or more quantum control devices.

Some quantum gate operations (referred to herein as quantum gates) can be implemented based at least in part on operating frequencies (e.g., transition frequencies) of the qubits. As an example, the quantum gates can be diabatic quantum gates. Diabatic quantum gates can be implemented by resonance of transition frequencies between a first qubit and a second qubit. For instance, diabatic controlled-Z (also referred to as CZ) quantum gates can be implemented based on resonance between a 01 transition frequency in a first qubit and a 12 transition frequency in a second qubit.

During implementation of the (e.g., diabatic controlled-Z) gate between the first qubit and the second qubit, the operating frequency of the first qubit and the second qubit can be tuned based on a target frequency difference $|f_1-f_2|$ between the operating frequency of the first qubit, $f_1$, and the operating frequency of the second qubit, $f_2$. For instance, the first qubit and/or the second qubit can be tuned to implement the quantum gate to one of two configurations, in which either $f_1 > f_2$ or $f_1 < f_2$, but in both cases a common frequency difference is defined between the two qubits. Both configurations are valid in implementing the same quantum gate.

However, aspects of the present disclosure recognize that although both configurations are valid for implementing the (e.g., diabatic controlled-Z) quantum gate, these two configurations have slight operational differences which can be useful for reducing likelihood of a leakage condition, including leakage from the computational quantum states |0⟩ and |1⟩ into the non-computational leakage states, such as |2⟩, |3⟩, and beyond, according to example aspects of the present disclosure. A leakage condition at a data qubit can be significantly more destructive to quantum code evaluation than some other errors, such as a bit-flip, phase-flip, or gate error. Qubits desirably operate in states |0⟩ and |1⟩, or superposition thereof. However, a qubit may occasionally leak out of the computational space |0⟩ and |1⟩ and into the excited or noncomputational space having leakage states |2⟩ or greater. This leakage state can cause inaccurate evaluation of quantum algorithms. Additionally, in some cases, the leakage states can propagate to other qubits.

Consider the convention wherein, as an example, $f_{01}$ refers to a difference in frequency between the |0⟩ and |1⟩ states. The frequencies of two qubits can be offset by a qubit anharmonicity, which is represented by the symbol η. This spacing provides for resonance between $f_{12}$ of one qubit and $f_{01}$ of another, for example. In one example implementation of the diabatic controlled-Z gate, the initial two-qubit state |11⟩ is involved in Rabi oscillation with the nearly identical-energy state |20⟩. In this example, $f_1 > f_2$, so |2⟩ is on the higher-frequency qubit. Because of imperfect calibration and/or other factors, the leakage state |2⟩ is typically produced more frequently on the higher-frequency qubit, compared to the lower-frequency qubit.

In addition, a physical mechanism can remove the leakage state |2⟩ from the lower-frequency qubit, resulting in reduced leakage at the lower-frequency qubit. This physical mechanism results from nearly equal energy of states |12⟩ and |30⟩. For instance, the anharmonicity offset discussed previously can additionally provide for near-resonance between $f_{23}$ of one qubit and $f_{12}$ of another, resulting in nearly equal energies of states |12⟩ and |30⟩. This nearly equal energy, in turn, results in resonance between the states. Thus, in the presence of a |12⟩ state, the |2⟩ state can be removed and reset to a |0⟩ state. However, this mechanism results in the creation of a |3⟩ state on the higher-frequency qubit. In this way, the leakage is essentially moved from the lower-frequency qubit to the higher-frequency qubit. For instance, in one example implementation of repetition and/or surface code, a leakage state has a roughly 20% chance of moving from a lower-frequency side of a diabatic controlled-Z gate to a higher-frequency side of the gate. This can provide that, if a leakage condition deteriorates performance for some more fragile qubits more than for other qubits, it can be beneficial to place the more fragile qubits on the lower-frequency side of the (e.g., diabatic controlled-Z) quantum gates.

This principle can be applied to quantum error correction codes, such as the repetition code and the surface code. For instance, in at least these codes (or other suitable quantum grid configurations), there can be two types of qubits, including data qubits and measurement qubits. Quantum gates (e.g., diabatic CZ gates) can be applied between a data qubit and a measurement qubit. According to example aspects of the present disclosure, measurement qubits can be periodically reset to |0⟩ from any state (e.g., |1⟩, |2⟩, |3⟩). Thus, a leakage condition on a measurement qubit can be significantly less deteriorating to a quantum computing system than a leakage condition at a data qubit.

Thus, example aspects of the present disclosure are directed to defining qubit frequencies for implementing a higher-frequency side and a lower-frequency side of quantum gate operations to reduce the likelihood of a leakage condition being present in the quantum computing system. For instance, according to example aspects of the present disclosure, a higher-frequency side of a (e.g., diabatic controlled-Z) quantum gate can be implemented at a measurement qubit such that potential leakage conditions are more likely to move to the measurement qubit. The measurement qubit can be periodically refreshed or reset (e.g., by one or more quantum control devices), such as during part of normal quantum computing operations and/or auxiliary to normal quantum computing operations, such that the leakage condition can be removed from the quantum computing system.

For instance, one example implementation according to example aspects of the present disclosure provides a quantum computing system configured for removal of leakage states. The quantum computing system includes quantum hardware including a first qubit and a second qubit. The quantum computing system can additionally include one or more quantum control devices configured to control operation of at least the first qubit and the second qubit. For instance, the one or more quantum control devices can be configured to implement a quantum gate operation on the first qubit and the second qubit. In some implementations, the quantum gate operation can be a diabatic quantum gate operation and/or a controlled gate operation, such as a controlled-Z gate operation, such as a diabatic controlled-z gate operation.

The first qubit can be configured to have a first transition frequency and/or the second qubit can be configured to have a second transition frequency, such as for implementation of a quantum gate operation. The first transition frequency can be greater than the second transition frequency. For instance, the first qubit and the second qubit may be sides of a quantum gate operation based on a frequency difference, such as based at least in part on the first transition frequency and the second transition frequency. For instance, configuring the first transition frequency to be greater than the second transition frequency can provide that leakage states are more likely to be present at the first qubit, according to example aspects of the present disclosure.

Furthermore, the one or more quantum control devices can be configured to periodically reset a quantum state of the first qubit. Thus, the leakage states present at the first qubit can be removed from the quantum computing system. As one example, the first qubit can be a measurement qubit. Additionally and/or alternatively, the second qubit can be a data qubit. For instance, the first (e.g., measure) qubit can be periodically reset or refreshed responsive to quantum measurements or quantum read-outs (e.g., parity measurements) being taken from the measurement qubits. The first qubit can be periodically reset at any suitable interval, such as an interval on the order of microseconds (e.g., about one microsecond).

Another example aspect of the present disclosure provides for a computer-implemented method for implementing quantum gate operations. The computer-implemented method can be implemented by any suitable computing system, such as a quantum computing system including quantum hardware in communication with one or more quantum control devices.

The method can include configuring (e.g., by one or more quantum control devices) a first qubit of quantum hardware at a first transition frequency. The method can include configuring (e.g., by the one or more quantum control devices) a second qubit of the quantum hardware at a second transition frequency. The first transition frequency can be greater than the second transition frequency. For instance, a frequency difference can be present between the first transition frequency and the second transition frequency. Configuring the first transition frequency to be greater than the second transition frequency can provide that leakage states are more likely to be present at the first qubit, according to example aspects of the present disclosure.

The method can include implementing (e.g., by the one or more quantum control devices) a quantum gate operation at the first qubit and the second qubit based at least in part on the first transition frequency and the second transition frequency. For instance, the first qubit and the second qubit may each implement a side of a quantum gate operation. The quantum gate operation can be implemented based at least in part on a frequency difference between the first qubit and the second qubit, such as based at least in part on the first transition frequency and the second transition frequency. In some implementations, the quantum gate operation can be or can include a diabatic controlled-Z quantum gate.

The one or more quantum control devices can be configured to periodically reset a quantum state of the first qubit. Thus, the leakage states present at the first qubit can be removed from the quantum computing system. As one example, the first qubit can be a measurement qubit. Additionally and/or alternatively, the second qubit can be a data qubit. Furthermore, in some implementations, the quantum hardware can be arranged in a quantum surface code. The first (e.g., measure) qubit can be periodically reset or refreshed responsive to quantum measurements or quantum read-outs (e.g., parity measurements) being taken from the measurement qubits. The first qubit can be periodically reset at any suitable interval, such as an interval on the order of microseconds (e.g., about one microsecond).

In some embodiments, this principle can be applied to qubit grids comprising a plurality of qubits. In a qubit grid, some or all combinations of data and measurement qubits can be configured wherein an operating frequency of the data qubit is lower than an operating frequency of the measurement qubit and defining a frequency difference to implement a quantum gate operation. For instance, in some implementations, only a subset of quantum gate operations at a particular (e.g., data) qubit are implemented in the configuration wherein an operating frequency of the data qubit is lower than an operating frequency of the measurement qubit. In some implementations, all quantum gate operations at a particular (e.g., data) qubit can be implemented wherein an operating frequency of the qubit is lower than an operating frequency of an adjacent (e.g., measurement) qubit. It is desirable to avoid cases where a data qubit is on the higher-frequency side of all (e.g., four) diabatic controlled-Z gates connected to it, because the leakage will then accumulate on the data qubit where it may not be removed. For instance, it can be beneficial that a data qubit implements a lower-frequency side of at least one quantum gate operation at the data qubit.

Another example aspect of the present disclosure provides for a quantum computing system configured for removal of leakage states. The quantum system can include quantum hardware including a plurality of qubits arranged in a qubit grid. The plurality of qubits can include one or more data qubits and/or a plurality of measurement qubits. For example, the plurality of qubits can be arranged in a quantum surface code, repetition code, etc.

The one or more data qubits can be configured to implement quantum gate operations with the plurality of measurement qubits. The quantum gate operations each can include a higher-frequency side and a lower-frequency side. According to example aspects of the present disclosure, the lower-frequency side is implemented at the one or more data qubits. For instance, configuring the first transition frequency to be greater than the second transition frequency can provide that leakage states are more likely to be present at the first qubit, according to example aspects of the present disclosure. In some implementations, the quantum gate operation can be a diabatic quantum gate operation and/or a controlled gate operation, such as a controlled-Z gate operation, such as a diabatic controlled-z gate operation.

A quantum gate operation can be implemented between a first qubit and a second qubit. The first qubit can be configured to have a first transition frequency and/or the second qubit can be configured to have a second transition frequency, such as for implementation of a quantum gate operation. If the first qubit is on the higher-frequency side of the quantum gate operation and/or if the second qubit is on the lower-frequency side of the quantum gate operation, then the first transition frequency can be greater than the second transition frequency. For instance, the first qubit and the second qubit may be sides of a quantum gate operation based on a frequency difference, such as based at least in part on the first transition frequency and the second transition frequency.

In some example implementations, a lower-frequency side of a quantum gate operation is implemented on a data qubit. Additionally and/or alternatively, a higher-frequency side of the quantum gate operation can be implemented on a measurement qubit. For example, if a data qubit is provided in a qubit grid where the data qubit is surrounded by a plurality of (e.g., four) measurement qubits and configured to implement a plurality of (e.g., four) quantum gate operations with the plurality of measurement qubits, then the data qubit may be provided at the lower-frequency side of each of those quantum gate operations. Additionally and/or alternatively (e.g., in the case of four total quantum gate operations at a data qubit), a lower-frequency side of two of the quantum gate operations can be implemented at a data qubit of the one or more data qubits, and/or a higher-frequency side of two of the quantum gate operations can be implemented at the data qubit. These configurations may be provided randomly and/or regularly throughout the quantum grid. For example, the grid may form a regular pattern of quantum gate operation configurations and/or the configurations may be provided randomly or arbitrarily, such as to satisfy other optimization constraints.

For instance, in the surface code where four controlled-Z gates are provided per data qubit and per code cycle, there may be a possibility of a leakage condition moving a second time, first from the data qubit to a measurement qubit and then from a measurement qubit to another data qubit, before it can be removed by resetting the measurement qubit. One approach to reduce the likelihood of this occurring, according to example aspects of the present disclosure, is to configure a data qubit having four controlled-Z gates such that the data qubit is on the lower-frequency side of two of the four CZ gates and the higher-frequency side of the other two of the four CZ gates. This configuration can be provided randomly and/or regularly throughout the quantum grid. For instance, by allowing either random or regular configurations, this can free up optimization considerations for other operation constraints.

Example aspects are discussed herein with references to implementations including diabatic controlled-Z gates for the purposes of illustration. It should be understood that example aspects of the present disclosure can find application in some other suitable quantum computing systems, such as quantum computing systems including quantum gates requiring a configurable frequency difference between two qubits, where the qubits are susceptible to leakage conditions, and/or where leakage conditions can be removed from at least some of the qubits in the quantum computing system.

Systems and methods according to example aspects of the present disclosure can provide for a number of technical effects and benefits, including improvements to computing technology. As one example, systems and methods according to example aspects of the present disclosure, such as systems and methods including quantum hardware having a first qubit and a second qubit, wherein the first qubit is configured to have a first transition frequency and wherein the second qubit is configured to have a second transition frequency, the first transition frequency being greater than the second transition frequency, and one or more quantum control devices configured to control operation of at least the first qubit and the second qubit, wherein the one or more quantum control devices are configured to implement a quantum gate operation on the first qubit and the second qubit based at least in part on the first transition frequency and the second transition frequency, and wherein the one or more quantum control devices are configured to periodically reset a quantum state of the first qubit. For instance, systems and methods according to example aspects of the present disclosure can provide for valid implementation of quantum algorithms (e.g., quantum gate operations) having improved robustness to leakage conditions.

Systems and methods according to example aspects of the present disclosure can provide for isolating leakage states at qubits that are periodically refreshed or reset back to a computational state (e.g., measurement qubits) such that the leakage states do not live in the quantum computing system for significant periods of time. For instance, in some example implementations, the lifetime of the leakage state $|2\rangle$ can be reduced to less than three cycles, even without natural energy relaxation of the leakage state. Natural energy relaxation refers to the capability of a qubit to relax over time down to a computational energy state. This, in turn, can provide for improved accuracy with regard to implementation of quantum algorithms. Additionally and/or alternatively, this can provide for reduced amounts of computational time and/or other resources lost to leakage conditions.

With reference now to the FIGS., example embodiments of the present disclosure will be discussed in further detail. As used here, the use of the term "about" in conjunction with a value refers to within 20% of the value.

FIG. 1 depicts an example quantum computing system 100 according to example embodiments of the present disclosure. The example system 100 is an example of a system on one or more classical computers or quantum computing devices in one or more locations, in which the systems, components, and techniques described below can be implemented. Those of ordinary skill in the art, using the disclosures provided herein, will understand that other quantum computing structures or systems can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

Figure 2:
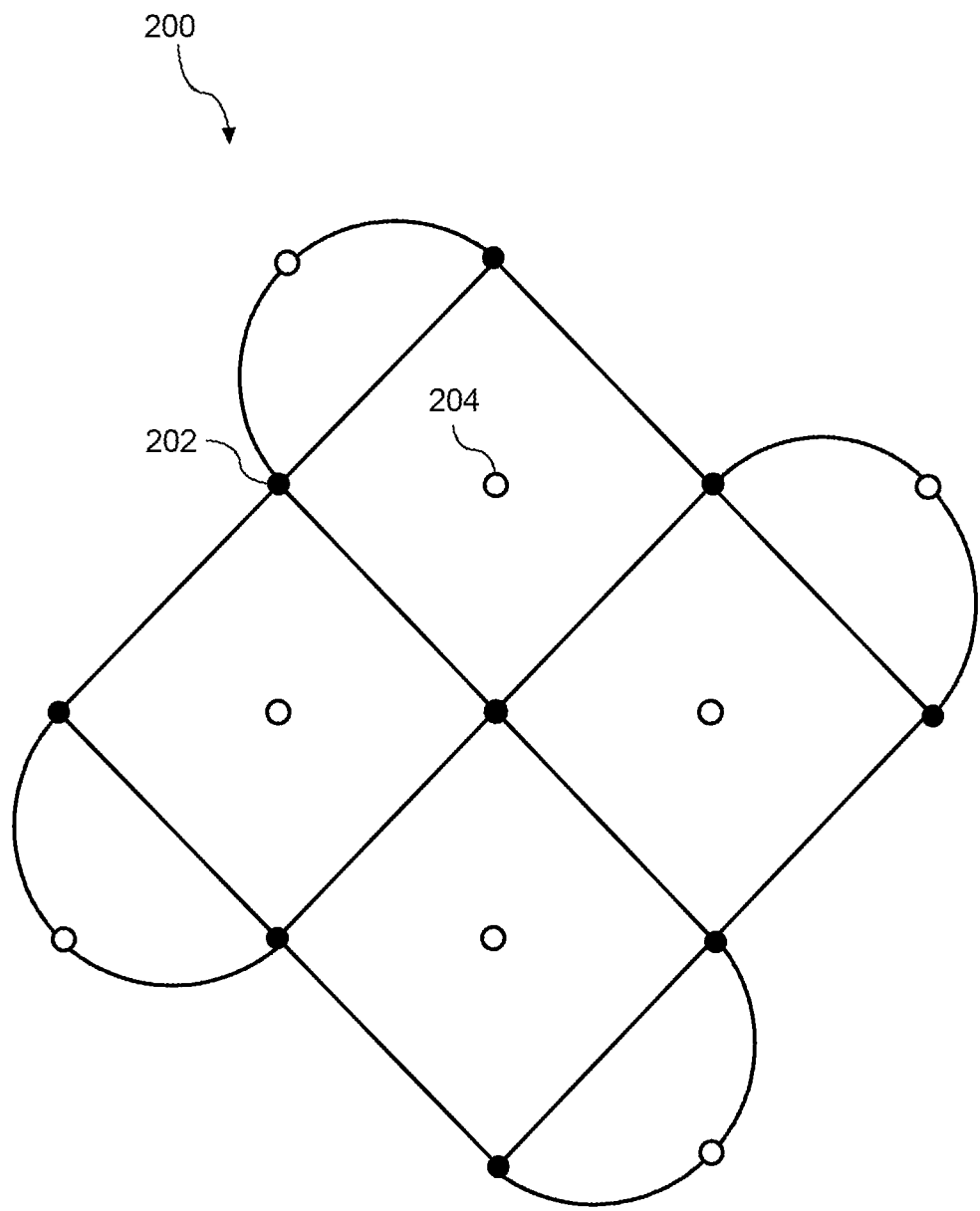
FIG. 2 depicts an example qubit grid according to example embodiments of the present disclosure.

FIG. 2 depicts an example qubit grid 200 according to example embodiments of the present disclosure. For instance, the qubit grid 200 can be provided according to the quantum surface code, repetition code, etc. As illustrated in FIG. 2, qubit grid 200 can be an interlaced qubit grid of one or more data qubits 202 and/or one or more measurement qubits 204. The measurement qubits 204 can be configured to provide readouts and/or measure errors (e.g., parity) in outputs of the data qubits 202. For instance, some of all of the data qubits 202 can be used to implement a time series of quantum gate operations defining a quantum algorithm across some or all data qubits 202. As illustrated in FIG. 2, a data qubit 202 can be surrounded by measurement qubits 204. Additionally and/or alternatively, a measurement qubit 204 can be positioned within a square or other surface defined by two or more (e.g., four) data qubits 202.

Figure 3:
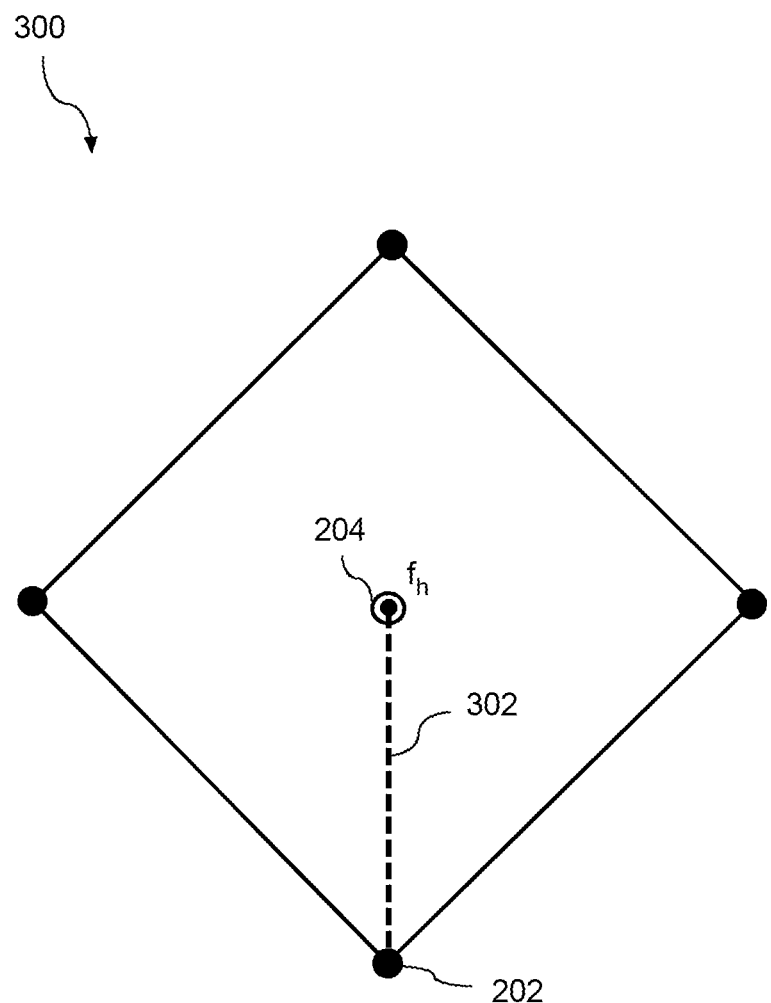
FIG. 3 depicts an example qubit grid used to implement a quantum gate operation according to example embodiments of the present disclosure.

FIG. 3 depicts an example qubit grid 300 used to implement a quantum gate operation according to example embodiments of the present disclosure. For instance, the qubit grid 300 can be provided according to the quantum surface code, repetition code, etc. As illustrated in FIG. 3, qubit grid 300 can be an interlaced qubit grid of one or more data qubits 202 and/or one or more measurement qubits 204. The measurement qubits 204 can be configured to provide readouts and/or measure errors (e.g., parity) in outputs of the data qubits 202. For instance, some of all of the data qubits 202 can be used to implement a time series of quantum gate operations defining a quantum algorithm across the some or all data qubits 202.

As illustrated in FIG. 3, a quantum gate operation 302 (e.g., a diabatic controlled-Z gate operation) can be implemented between two qubits, such as a data qubit 202 and measurement qubit 204. The quantum gate operation 302 can include a higher-frequency side (indicated by $f_h$) and a lower-frequency side (indicated by $f_l$). According to example aspects of the present disclosure, the lower-frequency side is implemented at the data qubit 202. Additionally and/or alternatively, the higher-frequency side is implemented at the measurement qubit 204. For instance, configuring the transition frequency of the measurement qubit 204 (e.g., $f_h$) to be greater than the transition frequency of the data qubit 202 (e.g., $f_l$) can provide that leakage states are more likely to be present at the first qubit, according to example aspects of the present disclosure. In some implementations, the quantum gate operation 302 can be a diabatic quantum gate operation and/or a controlled gate operation, such as a controlled-Z gate operation, such as a diabatic controlled-z gate operation.

Figure 4:
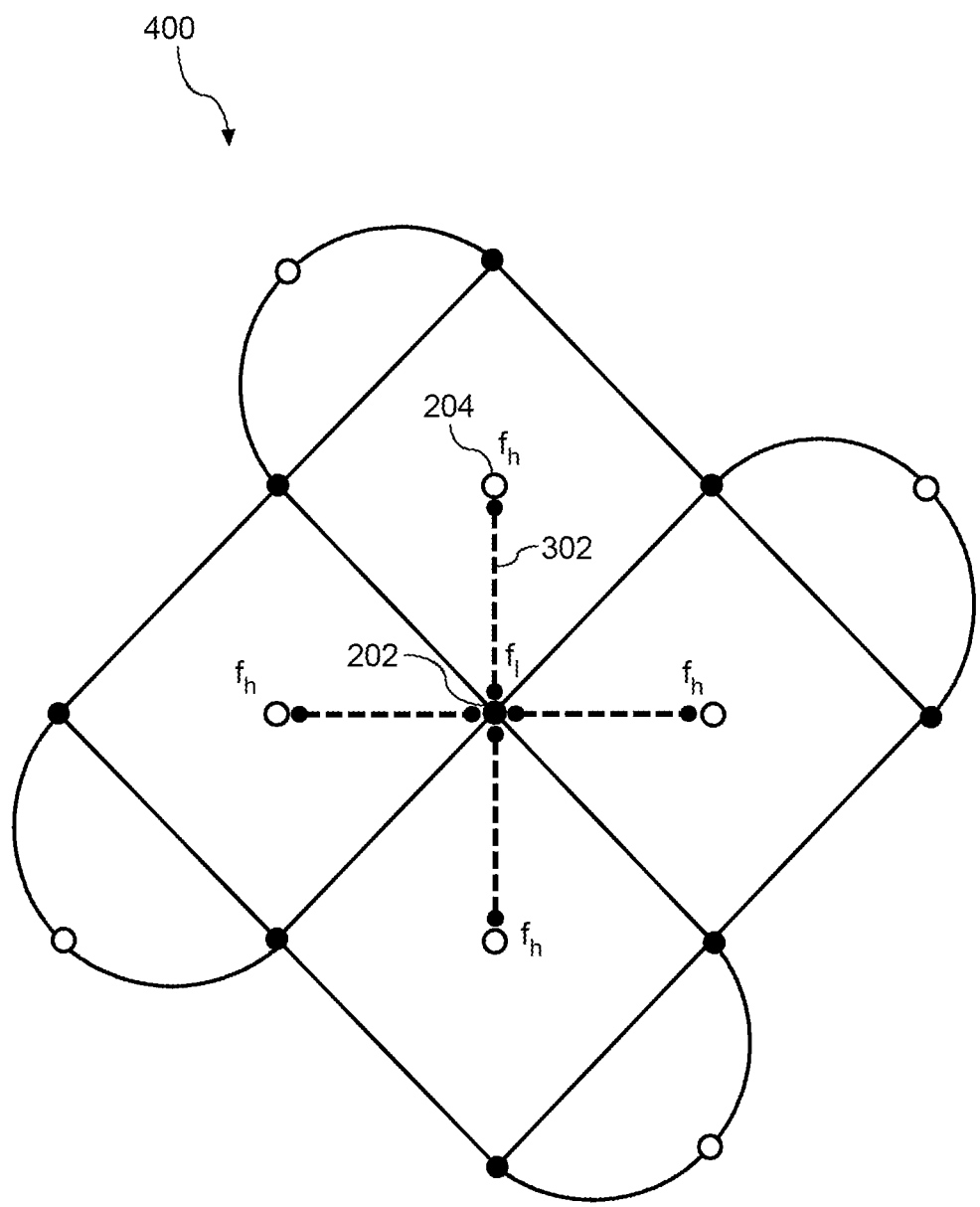
FIG. 4 depicts an example qubit grid used to implement quantum gate operations according to example embodiments of the present disclosure.

FIG. 4 depicts an example qubit grid 400 used to implement quantum gate operations according to example embodiments of the present disclosure. In the configuration depicted in FIG. 4, data qubit(s) 202 are implemented at a lower-frequency side of each quantum gate operation 302. For example, if a data qubit 202 is provided in qubit grid 400 such that the data qubit 202 is surrounded by four quantum gate operations 302 (e.g., four measurement qubits 204), then the data qubit 202 can be provided at the lower-frequency side of each of those four quantum gate operations 302.

Figure 5:
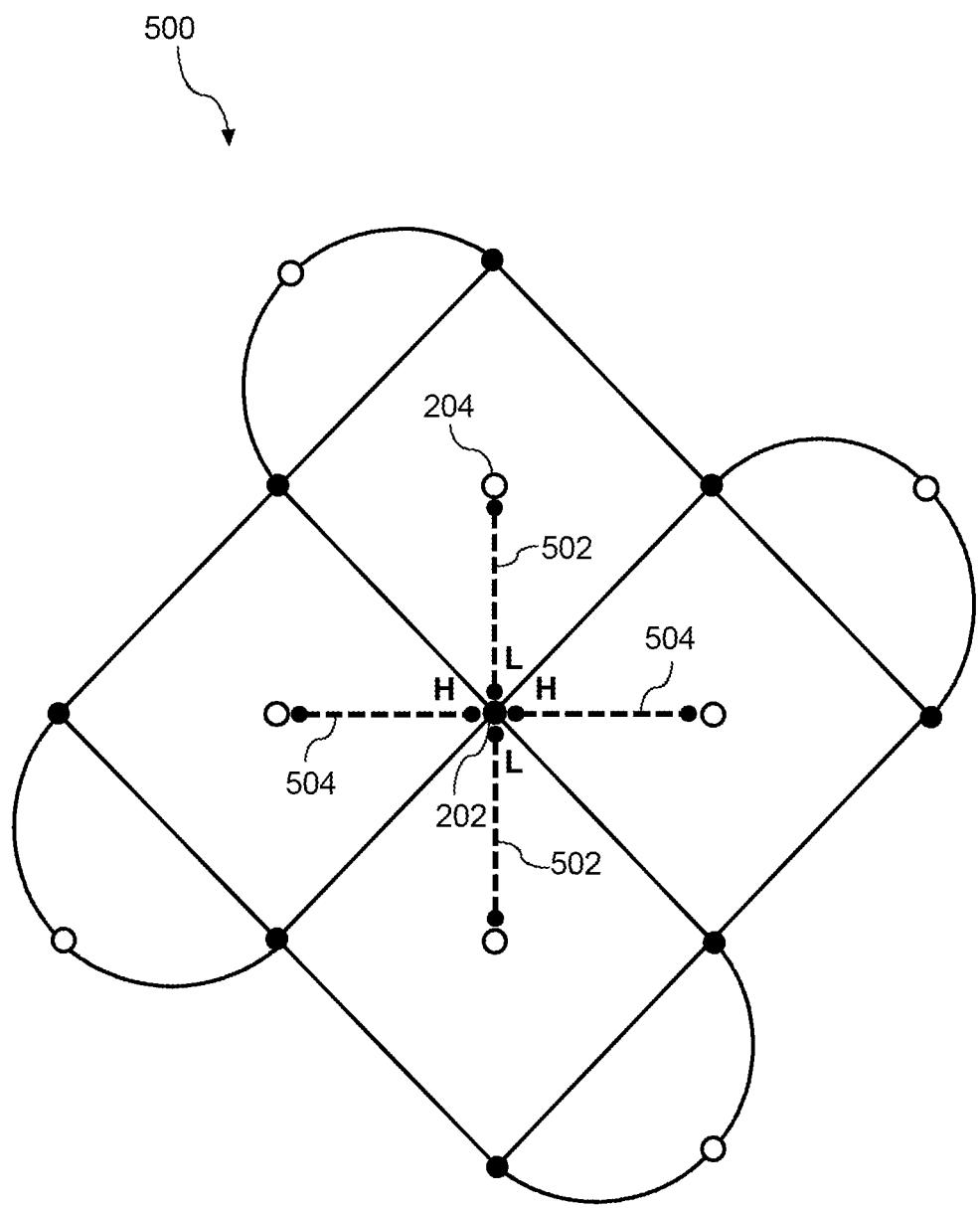
FIG. 5 depicts an example qubit grid used to implement quantum gate operations according to example embodiments of the present disclosure.

FIG. 5 depicts an example qubit grid 500 used to implement quantum gate operations according to example embodiments of the present disclosure. In the qubit grid 500 of FIG. 5, the data qubits 202 are used to implement a lower-frequency side of two of the quantum gate operations 502, and used to implement a higher-frequency side of two of the quantum gate operations 504. These arrangements may be provided randomly and/or regularly throughout the quantum grid 500. For example, the grid 500 may form a regular pattern of quantum gate configurations 502, 504 and/or the configurations may be provided randomly or arbitrarily, such as to satisfy other optimization constraints.

For instance, in the surface code where four controlled-Z gates are provided per data qubit 202 and per code cycle, there may be a possibility of a leakage condition moving a second time, first from the data qubit 202 to a measurement qubit 204 and then from a measurement qubit 204 to another data qubit 202, before it can be removed by resetting the measurement qubit 204. One approach to reduce the likelihood of this occurring, according to example aspects of the present disclosure, is to configure a data qubit 202 having four controlled-Z gates 502, 504 such that the data qubit 202 is on the lower-frequency side of two of the four CZ gates 502 and the higher-frequency side of the other two of the four CZ gates 504. This configuration can be provided randomly and/or regularly throughout the quantum grid 500. For instance, by allowing either random or regular arrangement, this can free up optimization considerations for other operation constraints.

Figure 6:
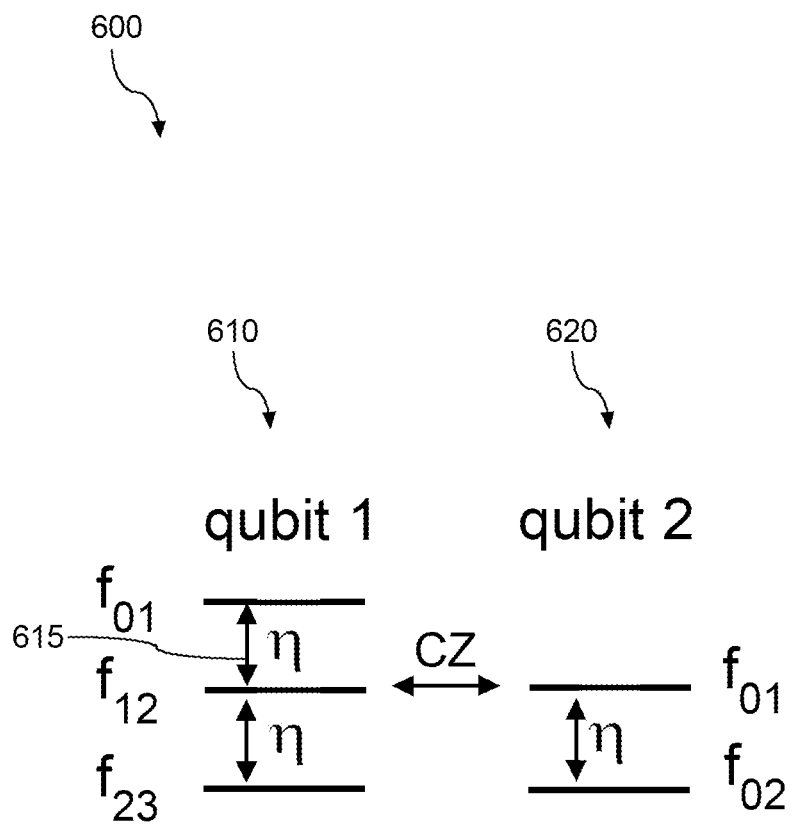
FIG. 6 depicts a frequency diagram illustrating example configuration of state frequencies on qubits according to example aspects of the present disclosure.

FIG. 6 depicts a frequency diagram 600 illustrating example configuration of state frequencies on qubits according to example aspects of the present disclosure. As used in FIG. 6, $f_{01}$ refers to a difference in frequency between the $|0\rangle$ and $|1\rangle$ states, for example, and other subscripts refer similarly to frequency differences. The frequencies of two qubits can be offset by a qubit anharmonicity 615, which is represented by the symbol η. As illustrated between the first qubit frequency diagram 610 and the second qubit frequency diagram 620 this spacing provides for resonance between $f_{23}$ of one qubit and $f_{12}$ of another, for example. This resonance can contribute to implementation of a diabatic controlled-Z quantum gate operation between the $f_{12}$ level at the first qubit and $f_{01}$ frequency at the second qubit, as illustrated in FIG. 6.

Figure 7:
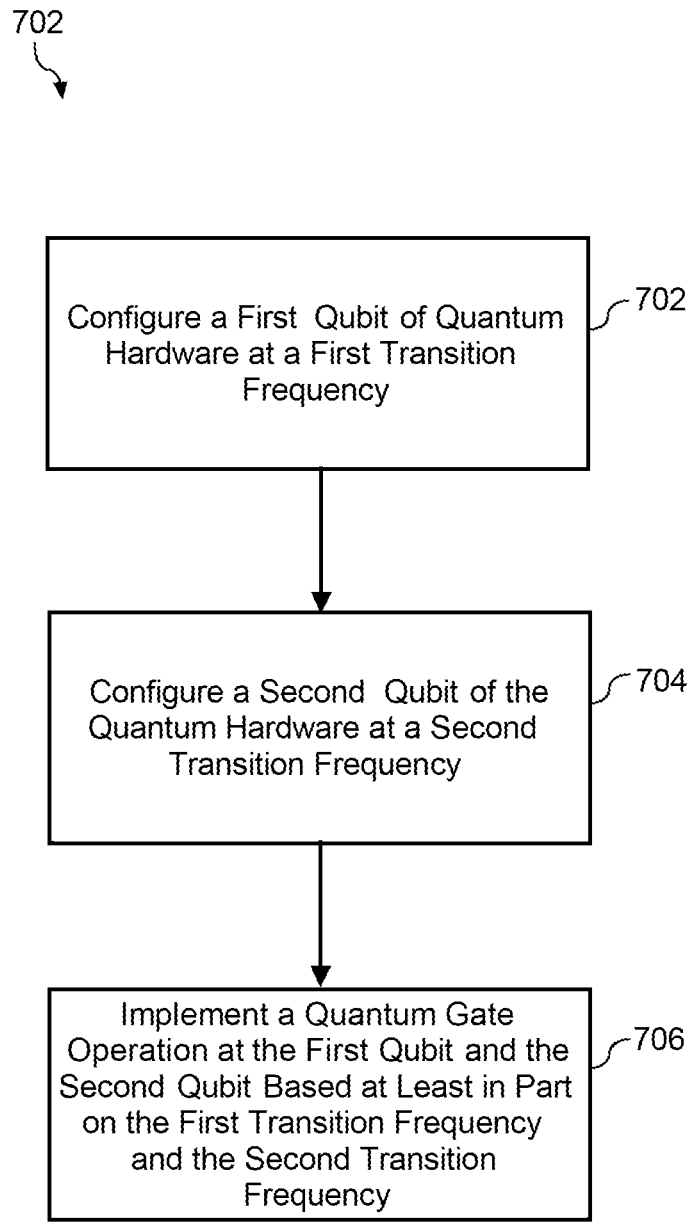
FIG. 7 depicts a flow chart diagram of an example method for implementing quantum gate operations according to example embodiments of the present disclosure.

FIG. 7 depicts a flow chart diagram of an example method 700 for implementing quantum gate operations according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure. The method 700 can be implemented by any suitable computing system, such as a quantum computing system including quantum hardware in communication with one or more quantum control devices, such as quantum computing system 100 of FIG. 1.

The method 700 can include, at 702, configuring (e.g., by one or more quantum control devices) a first qubit of quantum hardware at a first transition frequency. The method 700 can include, at 704, configuring (e.g., by the one or more quantum control devices) a second qubit of quantum hardware at a second transition frequency. The first transition frequency can be greater than the second transition frequency. For instance, a frequency difference can be present between the first transition frequency and the second transition frequency. Configuring the first transition frequency to be greater than the second transition frequency can provide that leakage states are more likely to be present at the first qubit, according to example aspects of the present disclosure.

The method 700 can include, at 706, implementing (e.g., by the one or more quantum control devices) a quantum gate operation at the first qubit and the second qubit based at least in part on the first transition frequency and the second transition frequency. For instance, the first qubit and the second qubit may be used to implement sides of a quantum gate operation based on a frequency difference, such as based at least in part on the first transition frequency and the second transition frequency. In some implementations, the quantum gate operation can be or can include a diabatic controlled-Z quantum gate.

The one or more quantum control devices can be configured to periodically reset a quantum state of the first qubit. Thus, the leakage states present at the first qubit can be removed from the quantum computing system. As one example, the first qubit can be a measurement qubit. Additionally and/or alternatively, the second qubit can be a data qubit. Furthermore, in some implementations, the quantum hardware can be arranged in a quantum surface code. The first (e.g., measure) qubit can be periodically reset or refreshed responsive to quantum measurements or quantum read-outs (e.g., parity measurements) being taken from the measurement qubits. The first qubit can be periodically reset at any suitable interval, such as an interval on the order of microseconds (e.g., about one microsecond).

Figure 8:
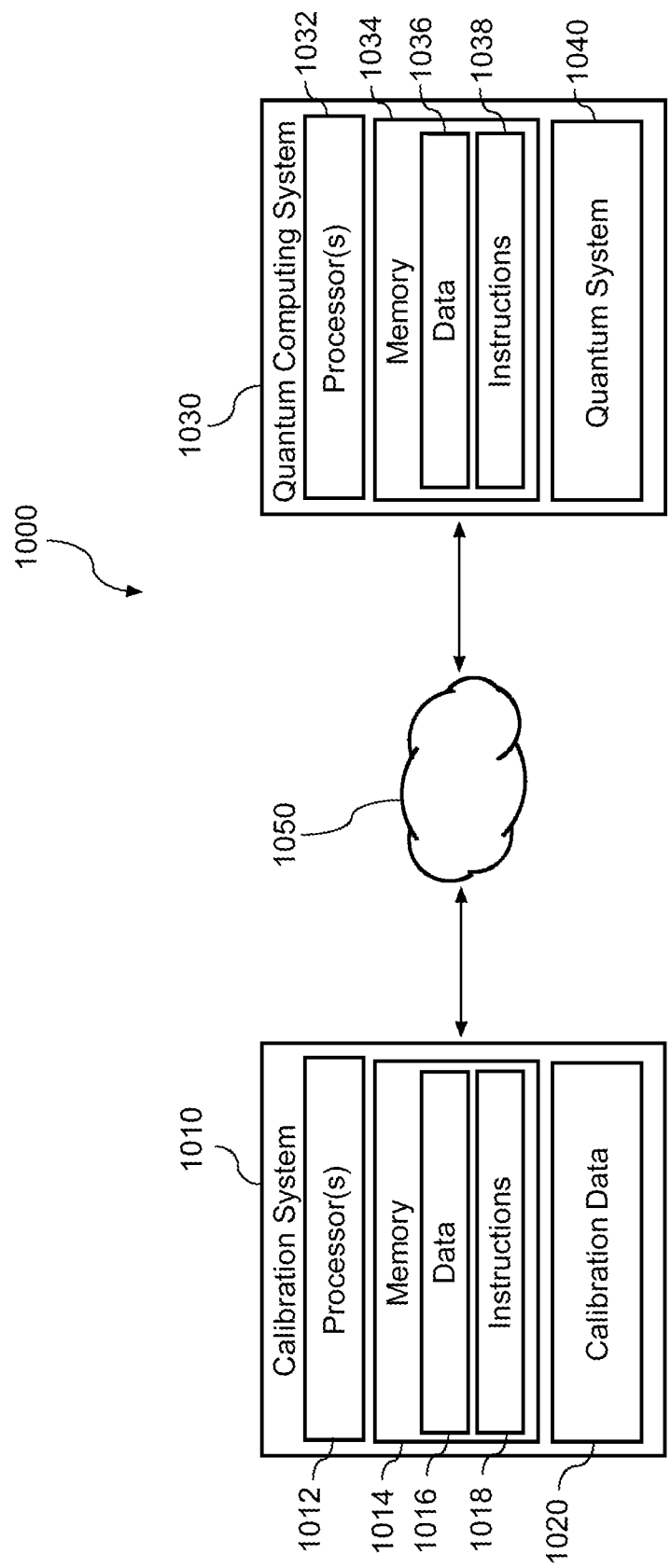
FIG. 8 depicts a block diagram of an example computing system that can be used to implement the systems and methods according to example embodiments of the present disclosure.

FIG. 8 depicts a block diagram of an example computing system 1000 that can be used to implement the systems and methods according to example embodiments of the present disclosure, such as the system discussed with reference to FIG. 1. The system 1000 includes a control system 1010 and a quantum computing system 1030 that are communicatively coupled over a network 1050. One or more aspects of any of the methods described herein can be implemented on the control system 1010 and/or the quantum computing system 1030.

The control system 1010 can include any type of computing device (e.g., classical computing device). The control system 1010 includes one or more processors 1012 and a memory 1014. The one or more processors 1012 can include any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage mediums, such as RAM, ROM, EEPROM, EPROM, flash memory devices, magnetic disks, etc., and combinations thereof. The memory 1014 can store data 1016 (e.g., qubit parameters, measurements, etc.) and instructions 1018 which are executed by the processor 1012 to cause the control system 1010 to perform operations, such as one or more aspects of any of the method disclosed herein. The control system 1010 can be configured to process error information 1020 obtained by measuring outputs of a quantum system (e.g., quantum system 1040) to identify errors in quantum computations according to example embodiments of the present disclosure. Additionally, the quantum control system 1010 can be configured to control operation (e.g., transition frequency) of the quantum system 1040.

The quantum computing system 1030 includes one or more processors 1032 and a memory 1034. The one or more processors 1032 can include suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage mediums, such as RAM, ROM, EEPROM, EPROM, flash memory devices, magnetic disks, etc., and combinations thereof. The memory 1034 can store data 1036 and instructions 1038 which are executed by the processor 1032 to cause the quantum computing system 1030 to perform operations, such as implementation of a quantum circuit having one or more quantum gates on a quantum system 1040 having a plurality of qubits and obtaining associated measurements (e.g., error information 1020). The quantum computing system 1030 can be similar to the quantum computing system discussed and described with reference to FIG. 1. Other suitable quantum computing systems can be used without deviating from the scope of the present disclosure.

The network 1050 can be any type of communications network, such as a local area network (e.g., intranet), wide area network (e.g., Internet), or some combination thereof and can include any number of wired or wireless links. In general, communication over the network 1050 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). In some implementations, the network 1050 may be omitted such that the control system 1010 is in direct signal communication with quantum computing system 1030.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A quantum computing system configured for removal of leakage states, the quantum computing system comprising:
    quantum hardware comprising a first measurement qubit and a data qubit, wherein the first measurement qubit is configured to have a first transition frequency and wherein the data qubit is configured to have a second transition frequency, the first transition frequency being greater than the second transition frequency; and
    one or more quantum control devices configured to control operation of at least the first measurement qubit and the data qubit, wherein the one or more quantum control devices are configured to implement a quantum gate operation on the first measurement qubit and the data qubit based at least in part on the first transition frequency and the second transition frequency, and wherein the one or more quantum control devices are configured to periodically reset a quantum state of the first measurement qubit.

2. The quantum computing system of claim 1, further comprising:
a second measurement qubit configured to have a third transition frequency, the third transition frequency being less than the second transition frequency;
and one or more quantum control devices configured to control operation of at least the data qubit and the second measurement qubit, wherein the one or more quantum control devices are configured to implement a quantum gate operation on the data qubit and the second measurement qubit based at least in part on the second transition frequency and the third transition frequency.

3. The quantum computing system of claim 1, wherein a $|12\rangle$ two-qubit state of the data qubit and the first measurement qubit is resonant with a $|30\rangle$ two-qubit state of the data qubit and the first measurement qubit, wherein the $|12\rangle$ two-qubit state comprises a $|2\rangle$ state of the data qubit, and the $|30\rangle$ state comprises a $|3\rangle$ state of the first measurement qubit.

4. The quantum computing system of claim 1, wherein the quantum gate operation comprises a diabatic quantum gate operation.

5. The quantum computing system of claim 1, wherein the quantum gate comprises a controlled gate operation.

6. The quantum computing system of claim 5, wherein the controlled gate operation comprises a controlled-Z gate operation.

7. The quantum computing system of claim 1, wherein the one or more quantum control devices are configured to periodically reset the quantum state of the first measurement qubit to a $|0\rangle$ state.

8. A quantum computing system configured for removal of leakage states, the quantum computing system comprising:
quantum hardware comprising a plurality of qubits arranged in a qubit grid, the plurality of qubits comprising one or more data qubits configured to implement quantum gate operations with a plurality of measurement qubits;
wherein the quantum gate operations each comprise a higher-frequency side and a lower-frequency side, wherein each respective data qubit of the one or more data qubits is configured to implement at least one quantum gate operation having a lower-frequency side configured to be implemented at the respective data qubit of the one or more data qubits.

9. The quantum computing system of claim 8, wherein the plurality of qubits are arranged in a quantum surface code.

10. The quantum computing system of claim 8, wherein the quantum gate operations comprise diabatic quantum gate operations.

11. The quantum computing system of claim 8, wherein the quantum gate operations comprise controlled-Z gate operations.

12. The quantum computing system of claim 8, wherein, for each quantum gate operation implemented at at least one data qubit of the one or more data qubits, a lower-frequency side of the quantum gate operation is implemented at the at least one data qubit.

13. The quantum computing system of claim 8, wherein a lower-frequency side of two of the quantum gate operations is implemented at at least one data qubit of the one or more data qubits, and wherein a higher-frequency side of two of the quantum gate operations is implemented at the at least one data qubit.

14. The quantum computing system of claim 13, wherein each data qubit of the one or more data qubits implements four quantum gate operations.

15. A method for implementing quantum gate operations, the method comprising:
configuring, by one or more quantum control devices, a first measurement qubit of quantum hardware at a first transition frequency;
configuring, by the one or more quantum control devices, a data qubit of the quantum hardware at a second transition frequency, the first transition frequency being greater than the second transition frequency; and
implementing, by the one or more quantum control devices, a quantum gate operation at the first measurement qubit and the data qubit based at least in part on the first transition frequency and the second transition frequency;
wherein the one or more quantum control devices are configured to periodically reset a quantum state of the first measurement qubit.

16. The method of claim 15, configuring, by one or more quantum control devices, a second measurement qubit of quantum hardware at a third transition frequency, the third transition frequency being less than the second transition frequency;
implementing, by the one or more quantum control devices, a quantum gate operation at the second measurement qubit and the data qubit based at least in part on the first transition frequency and the third transition frequency.

17. The method of claim 15, wherein a $|12\rangle$ two-qubit state of the data qubit and the first measurement qubit is resonant with a $|30\rangle$ two-qubit state of the data qubit and the first measurement qubit, wherein the $|12\rangle$ two-qubit state comprises a $|2\rangle$ state of the data qubit, and the $|30\rangle$ state comprises a $|3\rangle$ state of the first measurement qubit.

18. The method of claim 15, wherein the quantum gate operation comprises a diabatic controlled-Z quantum gate.

19. The method of claim 15, wherein a frequency difference is present between the first transition frequency and the second transition frequency, wherein the quantum gate operation is implemented based at least in part on the frequency difference.

20. The method of claim 15, wherein the quantum hardware is arranged in a quantum surface code.

* * * * *